United States Patent [19]  [11] 4,310,494
Welsh  [45] Jan. 12, 1982

[54] MANGANESE NITRATE SPRAY DECOMPOSITION

[75] Inventor: Jay Y. Welsh, Catonsville, Md.

[73] Assignee: Chemetals Corporation, Baltimore, Md.

[21] Appl. No.: 216,788

[22] Filed: Dec. 16, 1980

Related U.S. Application Data

[63] Continuation of Ser. No. 39,115, May 15, 1979, Pat. No. 4,250,149.

[51] Int. Cl.$^3$ ............................................. C01G 45/02
[52] U.S. Cl. ...................................... 423/49; 423/50; 423/605
[58] Field of Search ........................... 423/49, 50, 605

[56] References Cited

U.S. PATENT DOCUMENTS

| | | | |
|---|---|---|---|
| 2,374,674 | 5/1945 | Fox et al. | 423/605 |
| 2,681,268 | 6/1954 | Nissen | 423/50 |
| 2,691,569 | 10/1954 | Miller | 423/398 |
| 3,677,700 | 7/1972 | Fraser | 423/50 |
| 3,780,158 | 12/1973 | Welsh | 423/49 |
| 3,780,159 | 12/1973 | Welsh | 423/49 |
| 4,123,499 | 10/1978 | Welsh et al. | 423/49 |
| 4,141,963 | 2/1979 | Miller | 423/605 |

FOREIGN PATENT DOCUMENTS 2333532  1/1975 Fed. Rep. of Germany ...... 423/605

Primary Examiner—Herbert T. Carter
Attorney, Agent, or Firm—Keil & Witherspoon

[57] ABSTRACT

A method for thermally decomposing manganese nitrate in an aqueous solution containing alkali and/or alkaline earth nitrates including splashing said aqueous solution containing manganese nitrate to form droplets or sheets of solution, heating said droplets or sheets of solution to partially decompose each droplet or sheet of solution to form manganese dioxide and nitrogen dioxide, and reuniting said droplets or sheets of solution containing manganese dioxide with said aqueous solution containing manganese nitrate; and/or spraying said aqueous solution containing manganese nitrate to form droplets of solution, heating said droplets of solution to fully decompose each droplet to form nonstoichiometric manganese dioxide, and nitrogen dioxide, and recovering said nonstoichiometric manganese dioxide.

4 Claims, 5 Drawing Figures

MANGANESE NITRATE SPRAY DECOMPOSITION

This is a continuation of application Ser. No. 39,115, filed May 15, 1979, now U.S. Pat. No. 4,250,149 the entire specification of which is incorporated herein by reference.

FIELD OF THE INVENTION

The invention relates generally to a process for the thermal decomposition of manganese nitrate to manganese dioxide in a solution which contains alkali and/or alkaline earth nitrates, and more particularly to thermal decomposition of manganese nitrate obtained from a hydrometallurgical leaching process for the selective extraction and concentration of manganese, copper, nickel and cobalt from marine nodules or terrestrial ores containing alkali and/or alkaline earth compounds.

BACKGROUND OF THE INVENTION

Underwater deposits of manganese-bearing ores have been investigated for many years, but only recently have economic, strategic and environmental concerns encouraged the development of these materials as a viable alternative to conventional terrestrial mining techniques. The underwater deposits, variously referred to as marine nodules, sea nodules, ocean-floor nodules, manganese nodules, or maritime manganese ores, are distributed throughout the open oceans of the world and have also been discovered on the floor of inland lakes such as Lake Michigan.

Although the distribution of marine nodules is broad, it is also irregular, with areas of substantial concentration occurring both at great depths and on the shallower continental shelf. The characteristics of the marine nodules vary from one deposit to another, showing considerable differences in size, shape, internal structure, and composition. In general, the marine nodules are primarily agglomerates of manganese and iron oxides, containing lesser proportions of copper, nickel and cobalt compounds, and compounds of alkali and alkaline earth metals, along with traces of some two dozen metals such as molybdenum, lead, barium, vanadium, chromium, titanium, etc. The metal content of marine nodules is generally dependent upon the region from which the nodules are obtained, and economically important components vary in content within broad ranges. For example, manganese content may range from about 5 to 50 percent by weight, iron from about 5 to 40 percent by weight, copper from about 0.03 to 2 percent by weight, nickel from about 0.01 to 2 percent by weight, and cobalt from about 0.01 to 3 percent by weight.

This wide variation in metal values has complicated the refining of marine nodules and has led to the development of numerous processes for extracting the desirable materials. Straightforward physical methods for separating the metal components have not been successful due to the extremely fine-grained nature of the primary manganese oxide and iron oxide constituents. Pyrometallurgical techniques have inherent difficulties in achieving clean separations, probably due to the formation of complex metal alloys which are difficult to separate. Consequently, most effort has been directed to hydrometallurgical processes.

A hydrometallurgical process which provides a simple, direct method for selectively separating iron and manganese from marine nodules and from each other, without high processing costs, while at the same time efficiently recovering other desirable metal components, such as copper, nickel and cobalt from marine nodules, is set forth in my U.S. Pat. No. 4,123,499 entitled "Recovering Metal Values from Marine Manganese Nodules" which is hereby incorporated by reference. In accordance with the hydrometallurgical process described in my U.S. Pat. No. 4,123,499, and illustrated in FIG. 5, manganese-bearing ores such as marine nodules can be refined and various metal values efficiently recovered by first leaching the ore in an aqueous solution of nitrous and nitric acids to selectively solubilize the manganese, copper, nickel and cobalt as their respective nitrates, then separating the leach slurry from the insoluble iron oxide and gangue. The solution is then treated with manganous hydroxide in an amount at least equal to the stoichiometric value of metals other than manganese present in the solution. This treatment precipitates substantially all of the copper, nickel, and cobalt as a mixed metal hydroxide. If desired, the filtrate may optionally be further treated by the addition of hydrogen sulfide, which precipitates the remaining traces of copper, nickel, and cobalt as sulfides and assures virtually complete separation of these metals from the nitrate solution.

After filtration to remove the mixed metal hydroxide and sulfide precipitates, the solution containing manganese nitrate and alkali and alkaline earth nitrates is subjected to a thermal decomposition process to form high purity manganese oxide. It is important that this thermal decomposition process be carried out so that the manganese nitrate decomposition is complete, and so that the manganese oxide product is of high purity and is easily separated from the alkali and alkaline earth nitrate present in the mother liquor.

The present invention is directed to an improved process for the thermal decomposition of manganese nitrate to high purity manganese oxide, which is particularly advantageous in the process for recovering metal values from marine manganese nodules or terrestrial ores containing alkali and/or alkaline earth compounds as described in my issued U.S. Pat. No. 4,123,499.

SUMMARY OF THE INVENTION

It has been discovered that manganese nitrate in the presence of alkali and/or alkaline earth nitrates can be advantageously thermally decomposed to high purity manganese oxide by a thermal decomposition process. In an optional preliminary first thermal decomposition step, which may be called a splash decomposition, heat is exchanged between hot gases and a dispersed manganese nitrate-containing liquid phase consisting of drops or sheets of liquid, as opposed to a fine spray or thin liquid film. A relatively slow rate of thermal decomposition of manganese nitrate to manganese oxide is maintained during the preliminary first thermal decomposition step, allowing high purity manganese oxide crystals to form in the presence of alkali and alkaline earth compounds under approximate equilibrium conditions as described in my earlier U.S. Pat. No. 3,780,158, which is hereby incorporated by reference.

In the present invention, a second thermal decomposition step is used which ensures the decomposition of any manganese nitrate remaining in the mother liquor after the first thermal decomposition step. In the second thermal decomposition step, which may be called a spray decomposition, heat is exchanged between hot gases and a spray of very small, uniform liquid droplets of the manganese nitrate-containing solution. The second decomposition is very rapid and produces a reactive manganese oxide product which is deficient in oxygen relative to manganese dioxide.

It is an advantage of the present invention that it provides an improved process for the complete thermal decomposition of manganese nitrate in an aqueous solution containing alkali and/or alkaline earth compounds.

It is a further advantage of the present invention that it provides an improved process for preparing high purity manganese oxide by the thermal decomposition of manganese nitrate in an aqueous solution containing alkali and/or alkaline earth compounds.

It is another advantage of the present invention that it provides an improved process for preparing a reactive manganese oxide product which is deficient in oxygen relative to manganese dioxide by the thermal decomposition of manganese nitrate in an aqueous solution containing alkali and/or alkaline earth compounds.

Another advantage of the present invention is that it provides a process for preparing and easily separating a manganese oxide product in the form of a slurry.

Yet another advantage of the present invention is that it permits a much lower ratio of manganese to total alkali and alkaline earth compounds to be maintained in the decomposition chamber that can be maintained in my earlier U.S. Pat. No. 3,780,158.

Still other advantages of the invention will be readily apparent to those of ordinary skill in the art from the Figures and detailed description of the invention which follow.

While the invention will be described in connection with preferred procedures, it will be understood that it is not intended to limit the invention to those procedures. On the contrary, it is intended that the present invention encompass all alternatives, modifications and equivalents as may be included within the spirit and scope of the invention as defined by the claims.

DETAILED DESCRIPTION OF THE INVENTION

Figure 1:
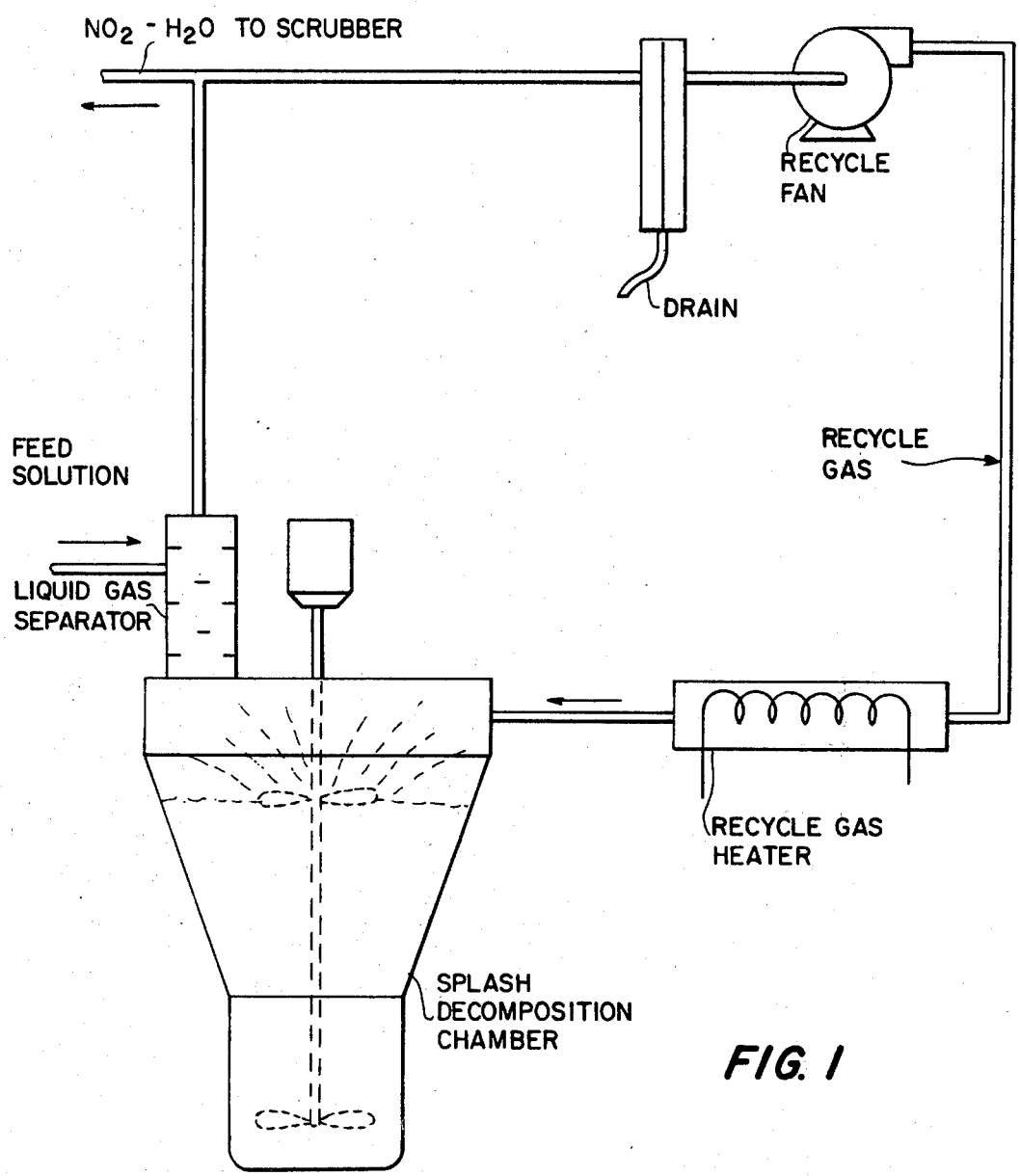
FIG. 1 is a flow diagram illustrating a preliminary splash decomposition according to the present invention.

Turning first to FIG. 1, there is shown a flow diagram illustrating a splash decomposition process for the thermal decomposition of manganese nitrate to high purity manganese dioxide from a solution containing alkali and/or alkaline earth compounds, such as nitrates. The splash decomposition illustrated in FIG. 1 is the preliminary first step of the thermal decomposition of the present invention. In the splash decomposition process illustrated in FIG. 1, a manganese nitrate solution or slurry is dispersed into droplets or sheets of liquid, as opposed to a fine spray or thin liquid film, and decomposed by heat exchange with hot gases such as steam or hot nitrogen dioxide. The droplets or sheets of liquid which characterize a splash decomposition process are typically formed by vigorous agitation of the surface of the manganese nitrate solution or slurry contained in a closed heat exchange and decomposition chamber. This vigorous agitation of the surface of the solution or slurry propels droplets or sheets of liquid solution or slurry into the hot atmosphere above the bulk liquid slurry of manganese nitrate solution containing manganese dioxide. The closed heat exchange and decomposition chamber comprises an upper heat exchange zone above the liquid slurry, into which the liquid slurry is propelled as droplets or sheets of liquid as described above, and a lower decomposition zone which contains the bulk liquid slurry of manganese nitrate solution containing manganese dioxide. The droplets or sheets of liquid slurry which characterize a splash decomposition process are sufficiently massive such that only a portion of the manganese nitrate contained in each droplet or sheet of liquid is thermally decomposed in the hot atmosphere of the closed heat exchange and decomposition chamber before the droplet or sheet of liquid falls back into the manganese nitrate slurry. Decomposition continues in the lower decomposition zone due at least in part to heat exchange between the hot gases and the surface of the bulk liquid slurry. Consequently, the product manganese dioxide crystals are formed under almost equilibrium conditions and are of high purity in a splash decomposition process.

In the splash decomposition process illustrated in FIG. 1, a closed heat exchange and splash decomposition chamber is illustrated. A feed solution containing manganese nitrate enters the closed decomposition chamber through a liquid-gas separator. This manganese nitrate solution may, for example, be a manganese nitrate solution to be thermally decomposed to manganese dioxide as described in my U.S. Pat. No. 4,123,499 entitled "Recovering Metal Values from Marine Manganese Nodules."

Two propellers are mounted on a single shaft extending vertically into the closed decomposition chamber. One propeller is mounted in the lower section of the decomposition chamber to suspend particles of manganese oxide product in the slurry of manganese nitrate and manganese oxide in the closed decomposition chamber. Another propeller is mounted at the liquid-gas interface to cause splashing of the manganese nitrate slurry into the gas phase. It will of course be understood that other means of vigorously agitating the surface of the manganese nitrate slurry to cause splashing of the slurry into the gas phase may also be used.

The splashed manganese nitrate slurry in FIG. 1 comes into contact and heat exchange with the heated recycle gas which is shown entering the upper portion of the closed decomposition chamber. The heated recycle gas supplies the heat of reaction for the thermal decomposition of manganese nitrate to form manganese dioxide. The heated recycle gas, along with gases generated in the thermal decomposition (such as nitrogen dioxide), are discharged through the liquid-gas separator to remove any carry-over of manganese nitrate. These gases are then fed to a scrubber system (not shown) to collapse the steam and absorb the nitrogen dioxide gas and produce manganese nitrate from the nitrogen dioxide gas and manganese bearing ore. It is a feature of the present invention that the manganese nitrate solution is fed into the closed decomposition chamber through a gas discharge port in the liquid-gas separator, to permit preheating of the feed solution and to ensure that no decomposition products build up at the gas discharge port.

The liquid level of the manganese nitrate slurry in the closed decomposition chamber may be controlled by a constant level overflow system. The constant level overflow system may also serve as a product discharge means. For example, the overflow from the closed decomposition chamber may be discharged into a thickener tank by a constant level overflow system. In the thickener tank, the high purity manganese dioxide product is separated from the mother liquor, and may then be collected in a product tank.

The splash decomposition process of the present invention is particularly adapted for the thermal decomposition of manganese nitrate solution obtained from my process for recovering metal values from marine manganese nodules as described in my U.S. Pat. No. 4,123,499 and illustrated in FIG. 5. The application of the splash decomposition process of the present invention to the thermal decomposition of manganese nitrate solution containing alkali and/or alkaline earth nitrates obtained from my process for recovering metal values from marine manganese nodules comprises the following steps:

(a) Leaching manganese-bearing marine nodules or terrestrial ores containing alkali and/or alkaline earth compounds with an aqueous solution of nitrous and nitric acids having a pH below about 2.5 to selectively dissolve manganese, copper, nickel, and cobalt, while retaining substantially all iron oxide in the gangue;

(b) Separating the insoluble iron oxide and gangue from the leach solution at a pH of less than 2.5;

(c) Adding to the leach solution a quantity of manganous oxide or manganous hydroxide to neutralize the solution and selectively precipitate copper, nickel, and cobalt;

(d) Removing precipitated copper, nickel, and cobalt hydroxides from the manganese nitrate-containing solution; and (e) Thermally decomposing the manganese nitrate solution containing alkali and/or alkaline earth nitrates according to the process of the present invention.

Figure 5:
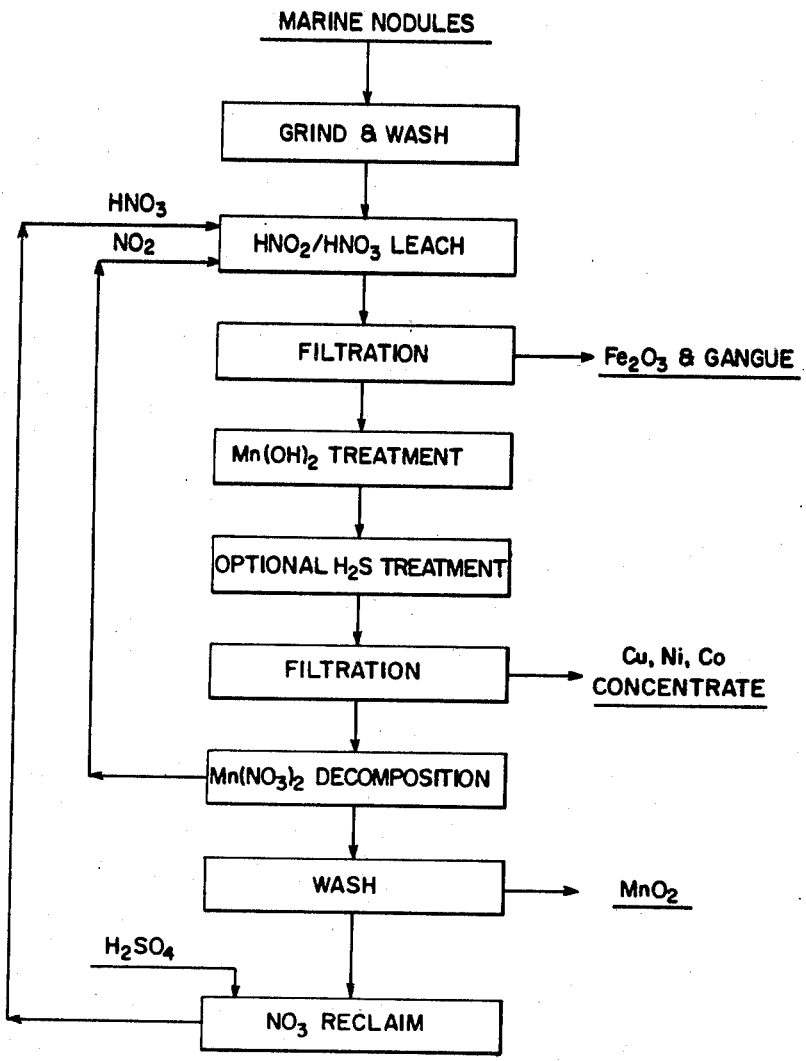
FIG. 5 is a flow diagram illustrating a process for recovering metal values from manganese-containing marine nodules or terrestrial ores containing alkali and/or alkaline earth compounds to which the manganese nitrate decomposition process of the present invention may be applied.

Futher features of the present invention which are related to my process for recovering metal values from marine nodules illustrated in FIG. 5 include the transferring of nitrogen dioxide gas obtained from the thermal decomposition of manganese nitrate according to the present invention to the aqueous leaching solution of my process for recovering metal values. Yet another feature of the present invention which is related to my process for recovering metal values from marine manganese nodules illustrated in FIG. 5 is the separation of undecomposed alkali and alkaline earth metal nitrates remaining after the decomposition of manganese nitrate according to the present invention, and the treatment of said alkali and alkaline earth metal nitrates with a mineral acid such as sulfuric acid to produce nitric acid which may be used in the leaching solution in my process for recovering metal values. Still other advantages of the present invention which are related to my process for recovering metal values from marine manganese nodules will be readily apparent to those of ordinary skill in the art from the complete specification and disclosure of my process for recovering metal values which is set forth in my U.S. Pat. No. 4,123,499, which is hereby incorporated by reference.

It is a feature of the present invention that the splash decomposition chamber, as well as the recycle gas pipes, may conveniently be insulated to prevent excess heat losses.

The splash decomposition system illustrated in FIG. 1 is found to produce a high purity manganese dioxide product by allowing manganese dioxide crystals to form under almost equilibrium conditions, as described in my earlier U.S. Pat. No. 3,780,158. This is accomplished because the droplets or sheets of liquid in a splash decomposition according to the present invention are sufficiently massive so that in a single cycle only a portion of the water contained in the liquid phase is removed. Consequently, the temperature change in the liquid phase is small. These characteristics define a splash decomposition according to my invention. A splash decomposition is further defined by the thermal balance in the closed chamber, viz., there is not sufficient heat in the upper heat exchange zone of the closed chamber at any dynamic moment to effect complete thermal decomposition of the manganese nitrate in that zone at that moment. As described in my earlier U.S. Pat. No. 3,780,158, the growth of manganese dioxide crystals under near-equilibrium conditions results in a well-defined, free-flowing, uniform and inclusion-free crystalline product of exceptional purity as described in Example 2 of U.S. Pat. No. 3,780,158. Such high purity manganese dioxide crystals are characteristic of the splash decomposition process of the present invention. In addition, because the droplets or sheets of liquid in the splash decomposition process of the present invention have sufficient surface area and are sufficiently small in size or thickness, the splash decomposition of the present invention permits product gases such as nitrogen dioxide to disengage from the relatively viscous mother liquor without causing foaming, which is a significant advantage of the splash decomposition process of the present invention.

Figure 3:
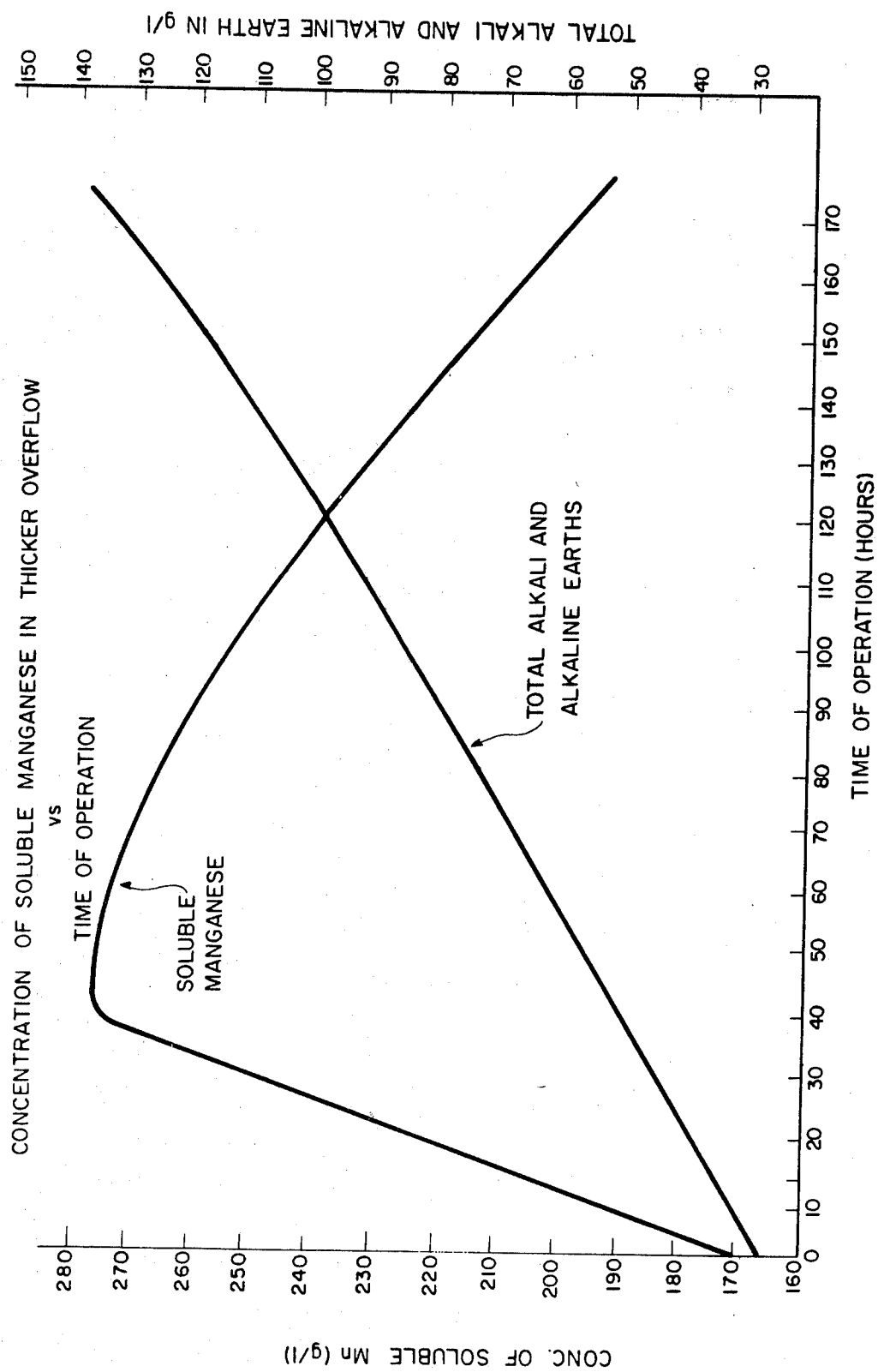
FIG. 3 is a graph illustrating the ratio of soluble manganese to total alkali and alkaline earth compounds present versus time in a splash decomposition.

Another significant advantage of the splash decomposition process of the present invention is that it permits a very low ratio of soluble manganese to total alkali and alkaline earth compounds to be maintained in the manganese nitrate solution in the splash decomposition chamber. In my earlier U.S. Pat. No. 3,780,158, it was necessary to maintain the ratio of soluble manganese to total alkali above about 1 to 1 to prevent the viscosity of the solution from interferring with the release of nitrogen dioxide gas and water vapor. In sharp contrast, in the splash decomposition process of the present invention, the manganese content in the manganese nitrate solution in the splash decomposition chamber can be reduced to as low as about 0.5 weight units of soluble manganese to one weight unit of total alkali and/or alkaline earths without causing foaming as the nitrogen dioxide gas and water vapor disengages from the relatively viscous mother liquor. It is an important feature of the present invention that it permits the manganese nitrate solution in the decomposition chamber to be reduced to about 0.5 to about 0.8 grams of soluble manganese per gram of total alkali and/or alkaline earths present after the splash decomposition process is complete, as illustrated in FIG. 3. This low concentration of soluble manganese relative to total alkali and/or alkaline earth content in the final nitrate solution after the splash decomposition is complete in turn permits a fluid product slurry to be formed in the decomposition of the present invention, which is called a spray decomposition, and is now described.

The thermal decomposition step of the present invention completes the decomposition of the manganese nitrate remaining in an aqueous solution containing alkali and/or alkaline earth nitrates, such as the mother liquor from the first thermal decomposition step. The thermal decomposition of the present invention may be called a spray decomposition. The thermal decomposition of the present invention, or spray decomposition, is accomplished by heat exchange between hot gases and very small, uniform liquid droplets of the manganese nitrate feed solution. In a spray decomposition, the very small liquid droplets of manganese nitrate solution are sufficiently small that in a single cycle all of the manganese nitrate contained in an individual droplet is decomposed. A spray decomposition is further defined by the thermal balance in the spray decomposition chamber, viz., there is sufficient heat in the spray decomposition chamber at any dynamic moment to effect complete thermal decomposition of the manganese nitrate in the airborne droplets. These characteristics define a spray decomposition according to my invention. As mentioned above, by maintaining the soluble manganese concentration in the feed solution in the spray decomposition at a concentration between about 0.5 to about 0.8 grams of soluble manganese per gram of total alkali and/or alkaline earth compounds, a fluid product slurry is obtained from the spray decomposition which is easily and efficiently separated from the gas stream. The fluid, or liquid, manganese oxide product slurry obtained is an important advantage of the spray decomposition of the present invention.

Figure 2:
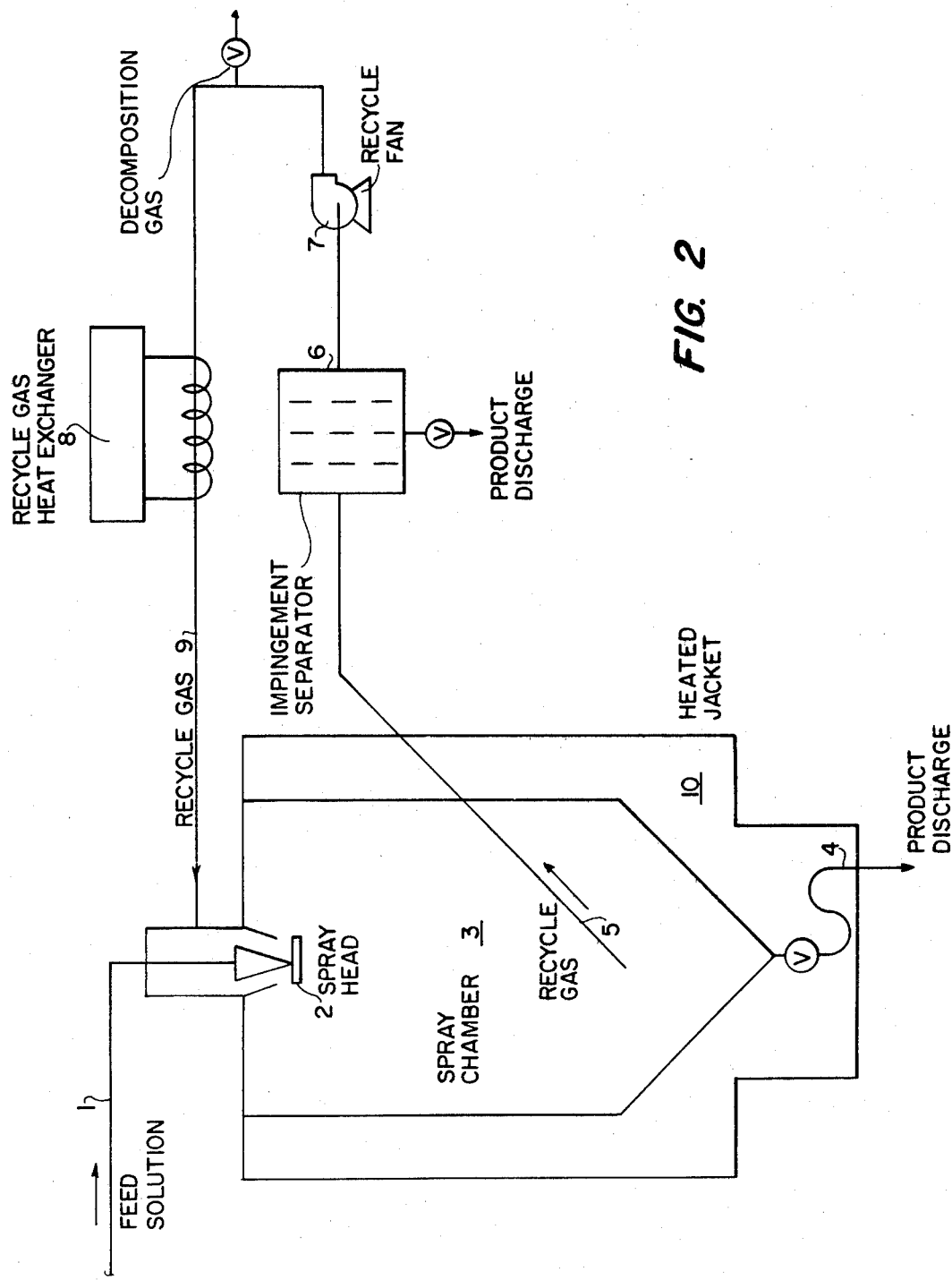
FIG. 2 is a flow diagram illustrating a spray decomposition according to the present invention.

Turning now to FIG. 2, there is illustrated a spray decomposition process according to the present invention. As illustrated in FIG. 2, a feed solution containing manganese nitrate, which is preferably the manganese nitrate solution after the splash decomposition process described above is complete, is fed into a spray chamber 3 via a spray head 2. Spray head 2 may be powered by compressed air from a compressor or an electric motor (not shown). The spray head 2 disperses the manganese nitrate feed solution into very small, uniform liquid droplets which come into contact with hot recycle gases 9 in the spray chamber 3. As can be seen from FIG. 2, recycle gases 9 are heated by recycle heat exchanger 8 and fed into the spray chamber at an inlet port adjacent to spray head 2. The heat exchange between the hot recycle gases 9 and the very small, uniform liquid droplets of manganese nitrate solution produces a very rapid thermal decomposition of the manganese nitrate to a "manganese dioxide" product which may be nonstoichiometric, e.g., which is deficient in oxygen. It is reported in the *Encyclopedia of Chemical Technology,* 2d Ed., at Volume 3, page 112, that in nonstoichiometric forms of manganese dioxide, the Mn/O ratio may range from about 1:1.7 to about 1:2. This nonstoichiometric "manganese dioxide" product will henceforth be called the manganese oxide product (of the spray decomposition). It is found that if the manganese nitrate feed solution in the spray decomposition contains between about 0.5 to about 1.0 grams of soluble manganese per gram of total alkali and/or alkaline earths, the product of the spray decomposition will maintain its fluid, liquid character. It is found that the manganese oxide product of the spray decomposition is in fact a droplet of a slurry of manganese oxide in a liquid melt of alkali and alkaline earth compounds, such as nitrates. It is an important feature of the spray decomposition of the present invention that this flowable liquid slurry of manganese oxide in a liquid melt of alkali and alkaline earth compounds may be easily removed from the bottom of the spray chamber by product discharge means 4. It is, of course, necessary to maintain the temperature in spray chamber 3 at a temperature sufficient to prevent the alkali and alkaline earth melt from solidifying. Suitably the spray chamber 3 may be heated by a heating jacket 10.

The decomposition product gases which are to be recycled, such as nitrogen dioxide gas and water vapor, leave spray chamber 3 by exit port 5 in the lower portion of the spray chamber. The recycle gases then pass through impingement separator 6 which separates any manganese oxide product which may have been carried with the recycle gases. Thereafter the recycle gases, drawn by recycle fan 7, are passed through the recycle gas heat exchanger 8 and then come into contact with the very small, uniform liquid droplets of manganese nitrate solution in spray chamber 3 to provide the required heat exchange.

Another feature of the spray decomposition process is that it permits decomposition gases containing nitrogen dioxide to be removed from the recycle gas, for example after passing through recycle fan 7. The nitrogen dioxide gas obtained from the thermal decomposition of manganese nitrate in the spray decomposition process may be usefully returned to the aqueous leaching solution of nitrous and nitric acids in my process for recovering metal values illustrated in FIG. 5.

The use of a recycle gas system to supply heat for the thermal decomposition in the spray decomposition process is advantageous because it avoids the introduction of additional gases into the recycle gas from which nitrogen dioxide is to be extracted and used as described above.

In the spray decomposition of the present invention, it is important to limit the manganese level in the manganese nitrate feed solution as described above to obtain a liquid or fluid manganese oxide-containing product, which is easily separated and removed from the recycle gas stream. It is found that, if the soluble manganese level in the manganese nitrate feed solution is too high, the manganese oxide-containing product acts like a dry particulate material, which is difficult to separate from the recycle gas stream in the spray chamber. The particulate manganese oxide material which results from too high a manganese level in the feed solution also tends to form thin films in the spray chamber causing problems of scaling, and surface abrasion in recovering the manganese oxide product. It is therefore an important advantage of the present invention that the manganese oxide product of the spray decomposition is a fluid or liquid slurry which may be easily separated from the recycle gas stream and is able to flow into a product container.

Other problems in collection and separation of a dry particulate product material, which are avoided by the spray decomposition of the present invention, include producing an appreciable quantity of manganese oxide particles which are too fine to separate in a centrifugal device. Furthermore, if the soluble manganese level in the manganese nitrate feed solution is permitted to become too high, i.e., above about 1 gram per gram of total alkali and alkaline earths, and alkali and alkaline earth melt in the nonfluid manganese oxide product can cause the manganese oxide particles to block or even absorb water if the environmental gas temperature drops below about 350° C. All of these conditions render conventional separation and collection methods virtually nonoperative. In sharp contrast, the spray decomposition of the present invention produces a fluid or liquid manganese oxide-containing product which is easily separated from the recycle gas stream by a cyclone separator or an impingement separator, as illustrated in FIG. 2.

Figure 4:
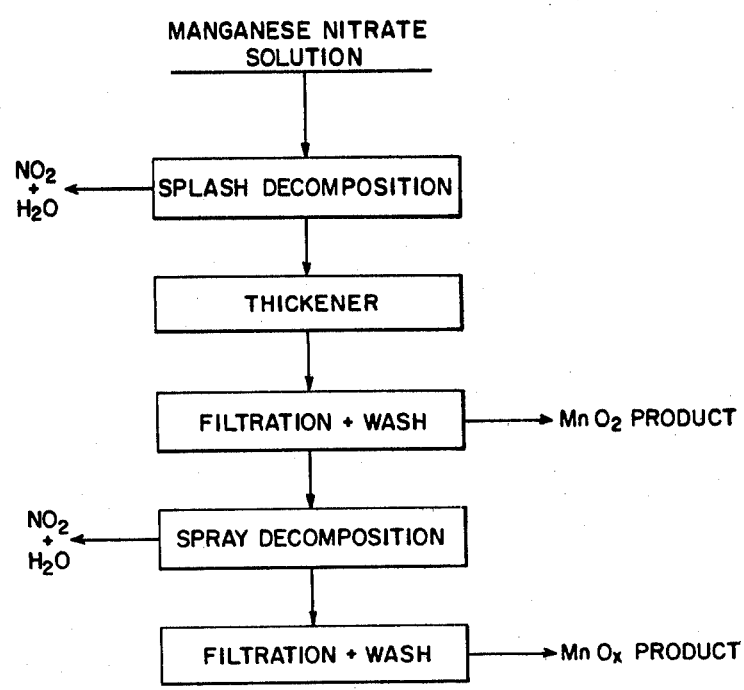
FIG. 4 is a flow diagram illustrating a thermal decomposition according to the present invention.

The spray decomposition process is particularly adapted to follow the splash decomposition process in the thermal decomposition of manganese nitrate solution as illustrated in FIG. 4. As discussed above, the splash decomposition process of the present invention is particularly adapted for the thermal decomposition of manganese nitrate solution obtained from my process for recovering metal values from marine manganese nodules as described in my issued U.S. Pat. No. 4,123,499 and illustrated in FIG. 5.

When the spray decomposition process of the present invention is used as the second step of a two-step decomposition process as illustrated in FIG. 4, the feed material of the spray decomposition process is the product manganese nitrate solution after treatment in the splash decomposition described above. Although the splash decomposition process can accomplish the complete decomposition of manganese nitrate to manganese dioxide, it is preferred to discontinue the splash decomposition process when the manganese nitrate solution in the splash decomposition chamber in FIG. 1 is reduced to about 0.5 to about 0.8 grams of soluble manganese per gram of total alkali and alkaline earths present in the manganese nitrate solution. It has been found that approximately 80% by weight of the manganese nitrate contained in the original feed solution obtained from my process for recovering metal values from marine manganese nodules is then decomposed in the splash decomposition process. The remaining manganese nitrate, constituting about 20% by weight of the manganese nitrate in the original feed solution is decomposed in the spray decomposition process of the present invention.

Both a splash decomposition process and a spray decomposition process will now be illustrated by an example. These examples are, of course, only illustrative, since alterations and modifications thereof will be apparent to those of ordinary skill in the art.

EXAMPLE 1

A splash decomposition was conducted using the apparatus illustrated in FIG. 1 and described above. The composition of the manganese nitrate feed solution and of the product manganese nitrate solution in the splash decomposition chamber after the splash decomposition process was discontinued are set forth below in Table 1.

The temperature of the manganese nitrate solution in the decomposition chamber during the decomposition process was approximately 142° C. Solution temperatures in the range from about 140° C. to about 150° C. are suitable during the decomposition process. During the decomposition process, the temperature of the heated recycle gas (at the gas exit) in the decomposition chamber was approximately 145° C. Gas temperatures in the heat exchange zone of the decomposition chamber range from about 142° C. to about 160° C. are suitable during the decomposition process. The pressure of the recycle gas in the decomposition chamber during the decomposition process was approximately one atmosphere. Pressures somewhat above or below one atmosphere are suitable during the decomposition process.

The decomposition chamber had a diameter in its upper portion of 45", while the agitator propeller at the gas-liquid interface had a diameter of 8.9" and rotated during the decomposition process at approximately 50 to 100 rpm to splash the manganese nitrate solution. Suitable splashing conditions will be readily apparent to those of ordinary skill in the art bearing in mind the required thermal balance in the splash chamber, described above.

TABLE 1

| Material Balances (Dry Basis) | |
|---|---|
| CMPD | RATE (gm/min) |
| Initial Feed | |
| $Mn(NO_3)_2$ | 230 |
| $NaNO_3$ | 15 |
| $KNO_3$ | 8 |
| $Mg(NO_3)_2$ | 24 |
| $Ca(NO_3)_2$ | 16 |
| Initial Product | |
| $Mn(NO_3)_2$ | 147 |
| $NaNO_3$ | 15 |
| $KNO_3$ | 8 |
| $Mg(NO_3)_2$ | 24 |
| $Ca(NO_3)_2$ | 16 |
| $MnO_2$ | 40 |
| $NO_2$ | 42 |

FIG. 3 illustrates the concentration of soluble manganese in the manganese nitrate solution as a function of time of operation of the splash process. It was found that the process operated smoothly over a period of approximately 170 hours and that a ratio of soluble manganese to total alkaline earths of about 0.5:1 was easily obtained.

EXAMPLE 2

A spray decomposition was conducted using apparatus illustrated in FIG. 2 and described above. A manganese nitrate feed solution containing 94.7 g/l of Mn and 495 g/l of alkali and alkaline earth nitrates was subjected to a spray decomposition for 11 hours at an average of 11 l/hr. of feed solution. The volume of the spray chamber was about 30 ft$^3$. It was found that the spray decomposition process was nearly 100% efficient. That is, only traces of manganese nitrate (less than 0.1% of the total Mn in the feed) was left undecomposed in the decomposition product and no nitrogen dioxide gas was thermally decomposed in the recycle gas heat exchanger. The temperature of the recycle gas entering the spray chamber was about 357° C. at a flow rate of approximately 300 cfm. Inlet gas temperatures between about 320° C. and about 420° C. are suitable in the spray decomposition process. The flow rate of the recycle gas entering the spray chamber and the flow rate of the manganese nitrate feed solution entering the spray chamber are related. The recycle gas must enter the spray chamber at a sufficient rate and at a sufficient temperature to provide sufficient heat in the spray chamber at any dynamic or operating moment of the process to effect complete thermal decomposition of the airborne manganese nitrate droplets. The airborne manganese nitrate liquid droplets in the spray decomposition process are very small, typically about 50 microns in diameter. Mean droplet sizes from about 20 microns up to about 1000 microns in diameter may be used in the spray decomposition process, subject to the requirement of sufficient heat transfer to effect complete thermal decomposition, as described above. It is also observed that the airborne manganese nitrate liquid droplets are rather uniform in diameter, typically varying only about 3 to 4 fold in diameter. The temperature of the manganese nitrate feed solution entering the spray chamber was about 100° C. Solution temperatures between about 60° C. and about 140° C. are suitable in the spray decomposition process. The temperature of the recycle gas exiting from the spray chamber was approximately 170° C. The spray head revolved at about 25,000 RPM. The jacket surrounding the spray chamber was maintained at a temperature of about 320° C. The nonstoichiometric manganese oxide product of the spray decomposition had the following analysis:

Product: 19.5% $Mn_xO_y$ (Mn=59.8%)

($MnO_2$=87.2%)

(CaO=0.53%)

(MgO=1.72%)

($Na_2O$=0.16%)

($K_2O$=0.11%)

(Chemical $H_2O$=3.75%)

80.5% alkali and alkaline earth nitrates and $H_2O$

It is understood that various other modifications will be apparent to and can readily be made by those skilled in the art without departing from the scope and spirit of this invention. Accordingly, it is not intended that the scope of the claims appended hereto be limited to the description set forth herein, but rather than the claims be construed as encompassing all the features of patentable novelty which reside in the present invention including all features which would be treated as equivalents thereof by those skilled in the art to which the invention pertains.

What is claimed is:

1. A method for decomposing manganese nitrate in an aqueous solution containing alkali and/or alkaline earth nitrates, comprising the steps of:
   (a) spraying said aqueous nitrate solution containing about 0.5 to 0.8 grams of soluble manganese per gram of total alkali and/or alkaline earth compounds to form droplets of solution,
   (b) heating said droplets of solution to fully decompose each droplet to form a fluid product slurry containing nonstoichiometric manganese dioxide, nitrogen dioxide and water vapor, and
   (c) recovering said fluid product slurry containing nonstoichiometric manganese dioxide.

2. The method according to claim 1, wherein said heated droplets of solution fully decomposed to form a fluid product slurry in a single cycle.

3. The method according to claim 1, including:
   (d) heating said nitrogen dioxide and water vapor, and
   (e) recycling said heated nitrogen dioxide and water vapor to heat said droplets of solution as set forth in step (b).

4. The method according to claim 3, wherein said heated droplets of solution fully decomposed to form a fluid product slurry in a single cycle.

* * * * *

UNITED STATES PATENT AND TRADEMARK OFFICE
CERTIFICATE OF CORRECTION

PATENT NO. : 4,310,494

DATED : January 12, 1982

INVENTOR(S) : Jay Y. Welsh

It is certified that error appears in the above—identified patent and that said Letters Patent is hereby corrected as shown below:

Column 7, line 29, delete "earth compounds", and substitute --earths--.

Claim 1, paragraph (a) should read:

(a) spraying said aqueous nitrate solution containing about 0.5 to 0.8 grams of soluble manganese per gram of total alkali and/or alkaline earths to form droplets of solution, Signed and Sealed this Sixteenth Day of November 1982

[SEAL]

Attest:

Attesting Officer

GERALD J. MOSSINGHOFF

Commissioner of Patents and Trademarks